US005780952A

United States Patent [19]

Lau

[11] Patent Number: 5,780,952

[45] Date of Patent: Jul. 14, 1998

[54] BRUSH ASSEMBLY FOR ELECTRIC MOTOR

[75] Inventor: James Ching Sik Lau, North Point, Hong Kong

[73] Assignee: Johnson Electric S.A., La Chaux de Fonds, Switzerland

[21] Appl. No.: 648,677

[22] Filed: May 16, 1996

[30] Foreign Application Priority Data

May 16, 1995 [GB] United Kingdom .................... 9509869

[51] Int. Cl.$^6$ .................................................. H02K 13/10

[52] U.S. Cl. ........................... 310/239; 310/244; 310/248; 310/251

[58] Field of Search ...................................... 310/239, 241, 310/244, 248, 251, 21 G, 230

[56] References Cited

U.S. PATENT DOCUMENTS

| | | | |
|---|---|---|---|
| 2,991,379 | 7/1961 | Van Dam | 310/247 |
| 3,691,542 | 9/1972 | Gabor | 310/248 |
| 4,152,614 | 5/1979 | Noguchi et al. | 310/233 |
| 4,746,829 | 5/1988 | Strobl | 310/239 |
| 4,983,873 | 1/1991 | Tanaka et al. | 310/248 |
| 5,019,741 | 5/1991 | Fukui et al. | 310/239 |
| 5,485,049 | 1/1996 | Shannon et al. | 310/248 |

FOREIGN PATENT DOCUMENTS

| | | | |
|---|---|---|---|
| 1174253 | 4/1957 | France . | |
| 2558012A | 9/1993 | France | 310/239 |
| 9106141 | 5/1991 | Germany . | |
| 9316543.9 | 10/1993 | Germany . | |
| 587896 | 8/1944 | United Kingdom . | |
| 0901656 | 10/1959 | United Kingdom | H02K 13/10 |
| 2110005 | 10/1982 | United Kingdom | H02K 13/10 |
| 2195835 | 8/1987 | United Kingdom | H02K 13/10 |
| 2214358 | 1/1988 | United Kingdom | H01R 39/39 |
| 9512239 | 5/1995 | WIPO . | |
| 9641410 | 1/1997 | WIPO | 310/239 |

*Primary Examiner*—Thomas M. Dougherty
*Assistant Examiner*—B. Mullins
*Attorney, Agent, or Firm*—Ostrolenk, Faber, Gerb & Soffen, LLP

[57] ABSTRACT

A brush assembly for an electric motor comprises a brush for making sliding contact with a commutator, the brush being fitted to an end of an elongate resilient electrically conductive brush arm fixed to a brush mounting plate. The brush and brush arm are arranged to ensure that the brush contacts the commutator at a single point in the vicinity of a side face of the brush so that the resilient urgings of the brush arm causing the brush to bear on the commutator surface creates a lateral twist in the elongate brush arm.

16 Claims, 5 Drawing Sheets

BRUSH ASSEMBLY FOR ELECTRIC MOTOR

BACKGROUND OF THE INVENTION

The present invention relates to a brush assembly for an electric motor, particularly but not exclusively, for miniature permanent magnet d.c. motors.

It is well known to use brush assemblies comprising a carbon brush fitted to the end of an elongate, resilient, electrically conductive support arm usually of a beryllium copper alloy which is in turn mounted to a brush holder of a more rigid nature, for example, brass, which may also form the motor terminal. In such motors, there is a problem with noise, both electrical and mechanical, being generated by the action of the brush on the commutator.

One method adopted to reduce the generation of electrical noise was to provide the brush face with a concave shape so that the brush contacts the commutator at two points. It was thought that as the commutator rotates, the brush bounces on the commutator due to the commutator not being perfectly round and through the brush contacting the edges of segments of the commutator as it rotates. By providing two contact points, the contact between the brush and the commutator segments was likely to be maintained as the brush twists and bounces during operation. Indeed, a significant improvement was achieved over the older flat faced design, resulting in a quicker wearing in of the brushes on the commutator surface, providing a better sliding contact between the commutator and the brushes. It was thought that the flat faced brush, in effect, as it was bedding in, only contacted the commutator at a single point.

Another method adopted requires vibration dampening material to be applied along the support arm to dampen the vibrations of the support arm to reduce the severity of the bouncing of the brush.

SUMMARY OF THE INVENTION

However, it has been found that by shaping the face of the brush so that it contacts the commutator at a single point adjacent either axial side face of the brush, further improvements in reducing the level of noise generated by the brush commutator interface can be achieved. It is thought that this is due to the shape of the brush face causing the brush to turn as the support arm urges the brush into contact with the commutator, putting a twisting moment on the brush leaf, resulting in lower bounce for the same brush pressure, allowing a lower brush pressure to be used for the same noise level generation, leading to greater brush life or, by maintaining brush pressure, and thus, brush life, significantly reducing the level of generated noise.

According to a first aspect, the present invention provides a brush body for an elongate brush arm of a miniature electric motor, the brush body having an upper face arranged for fixing with the brush arm, a lower face arranged for making sliding contact with a commutator of the motor; first and second sides extending between the upper and lower faces; and first and second end faces extending between the upper and lower faces and between the sides, the brush body being adapted so that in use the sides are spaced in the axial direction and the end faces are spaced in the circumferential direction of the commutator wherein the lower face has a single ridge extending between the first and second end faces and offset towards the first side.

Preferably the ridge extends substantially parallel to the upper face and the sides and substantially perpendicular to the end faces.

According to a second aspect, the present invention provides a brush assembly for an electric motor, the brush assembly comprising a brush body for making sliding contact with a commutator, a brush holder and an elongate resiliently flexible electrically conductive brush arm supporting the brush body and electrically connecting the brush body to the brush holder wherein the brush body contacts the commutator at a single point which is laterally offset from a central plane of the brush body such that the resilient urgings of the brush arm urging the brush body into contact with the commutator creates a twist in the brush arm.

This is preferably achieved by forming the face of the brush in a wedge shape.

Alternatively, the support arm and brush may be arranged so that the brush contacts the commutator at a single point along an edge of the brush face.

Very significant reduction in electrical noise generation has been achieved by using a single edge brush and a rubber damper fitted to the brush arm.

BRIEF DESCRIPTION OF THE DRAWINGS

Preferred embodiments of the invention will now be described, by way of example only, with reference to the accompanying drawings in which.

DETAIL DESCRIPTION OF THE PREFERRED EMBODIMENTS

Figure 1:
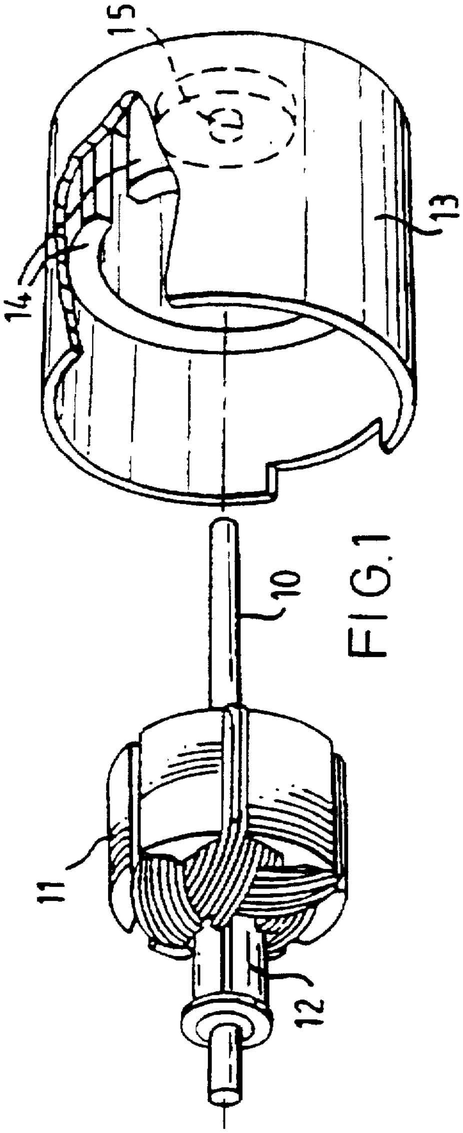
FIG. 1 is an isometric part broken away view of the motor with an end cap removed.

Referring to the drawings, in FIG. 1, the motor has a shaft 10 carrying a wound armature 11 and a commutator 12. A casing 13 has mounted therein two field magnets 14 and an end bearing 15 for supporting the shaft 10.

Figure 3:
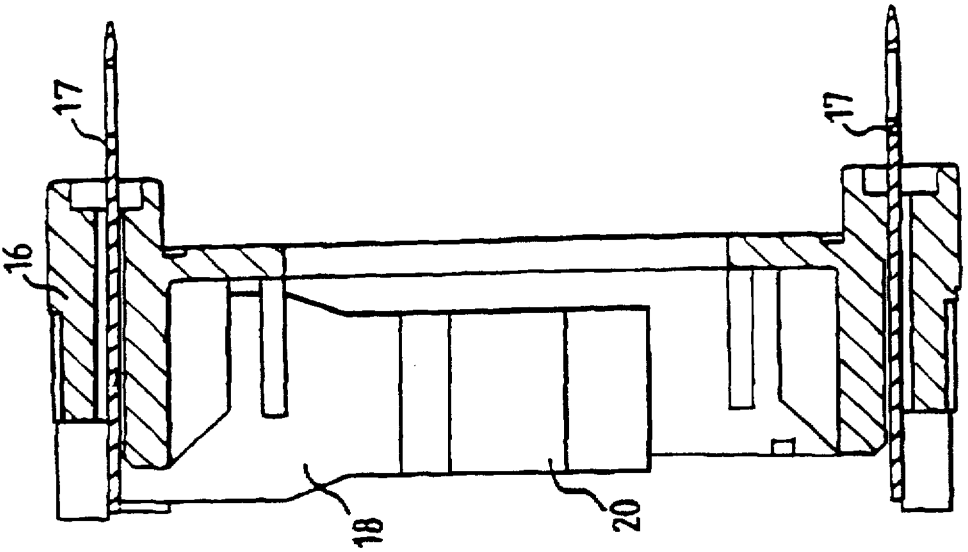
FIG. 3 is a sectioned side elevation of FIG. 2.
Figure 2:
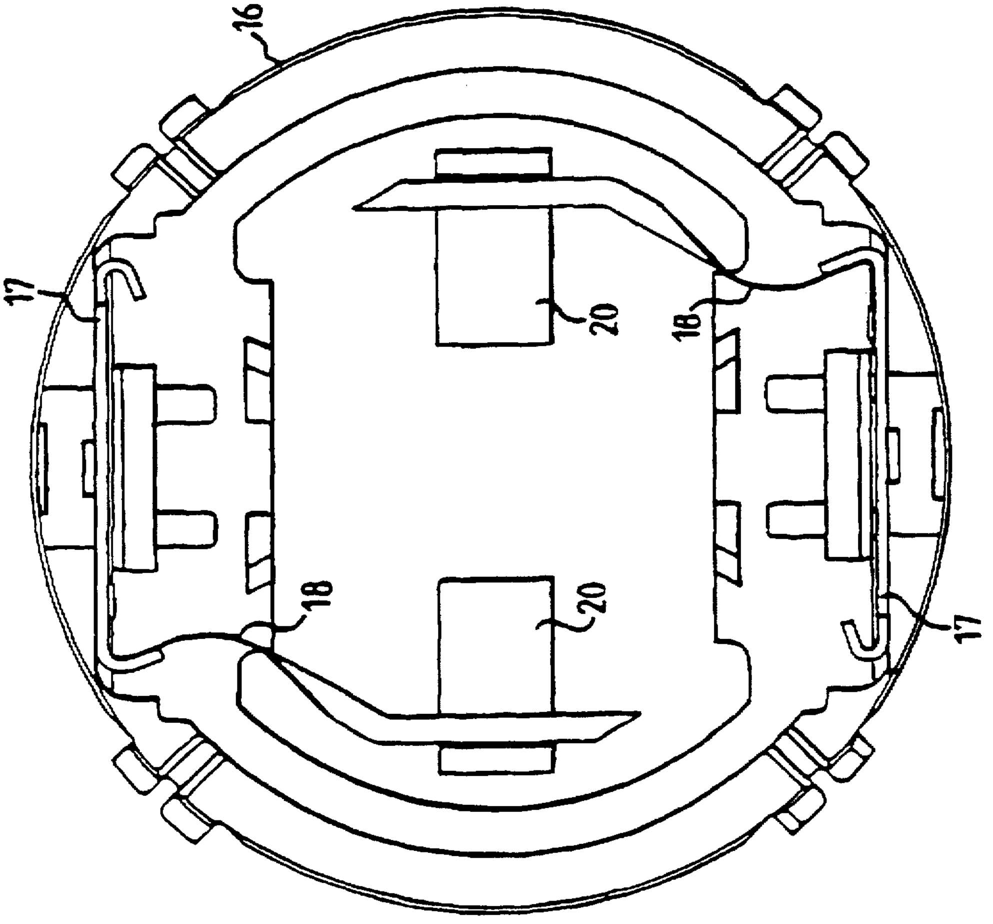
FIG. 2 is an end view of the inside of the end cap, showing a brush assembly.

In FIGS. 2 and 3, a moulded plastics material end cap 16 provides a brush holder which supports two brush assemblies. Each assembly has a terminal part 17 connected to a resilient brush supporting arm or brush leaf 18. Brush 20 is supported by the free end of the brush leaf The brush is urged in use into contact with the commutator 12 by the brush leaf 18.

Figure 4:
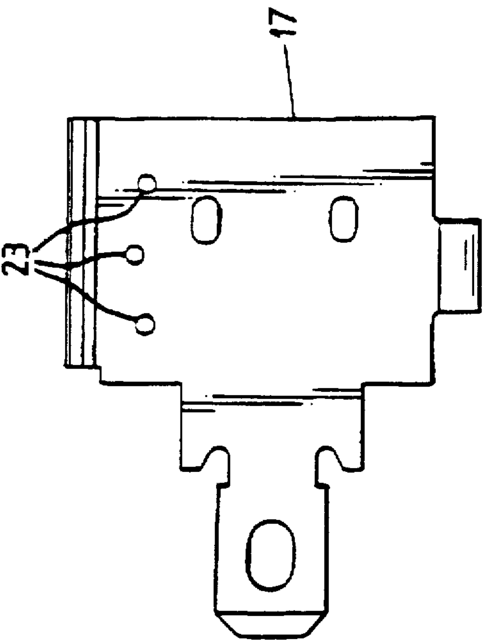
FIG. 4 is a top view of the brush assembly.
Figure 5:
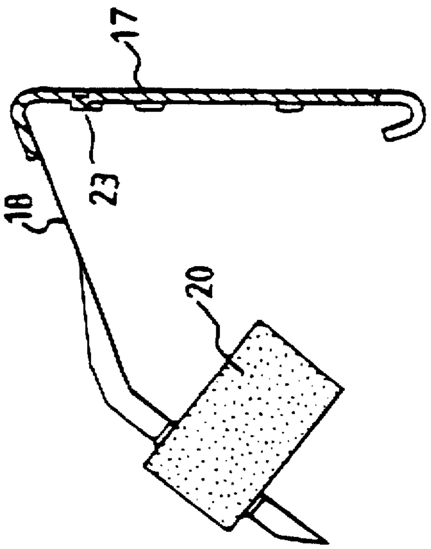
FIG. 5 is a side view of the brush assembly.
Figure 6:
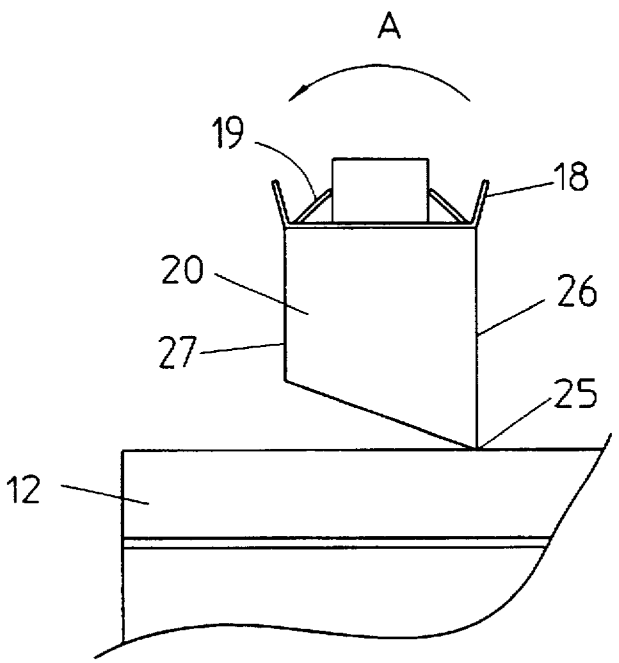
FIG. 6 illustrates contact between a brush of the brush assembly and a commutator of the motor.

In FIGS. 4 and 5, the terminals 17 and brush leaves are fixed together by a set of rivets 23. Other forms of fixing can be used, such as a clip fixing. The top of the brushes 20 are shaped to form a single castellation (see FIG. 6) and are held in slots provided in and adjacent the free ends of the brush leaves 18 by fingers 19 formed along edges of the slots which grip and bite into the castellation to secure the brush in place.

As can be seen from FIGS. 1 to 5, the brush assembly is similar to known leaf-type brush assemblies for miniature electric motors. However, as clearly shown in FIG. 6, the face of the brush which contacts the commutator is formed as a wedge shape or sloping surface to form a single contact ridge 25 with the commutator 12. However, as this ridge 25 is bearing circumferentially on the commutator, the brush contacts the commutator at a single point which is offset from the centre of the brush so that due to the resilient urgings of the brush arm 18, the brush 20 tends to pivot axially of the commutator causing the brush arm to twist as indicated by arrow A. This twisting seems to strengthen the brush arm against bouncing movement radially of the commutator. The single contact point also allows the brush to bed in more quickly creating a good sliding contact surface between the commutator and the brush 20.

The reduction in bouncing of the brush on the commutator reduces the creation of sparks between the brush and the commutator and the formation of a good sliding contact surface between the commutator and the brush reduces the level of noise, both electrical and mechanical, resulting in a quieter motor.

Figure 7:
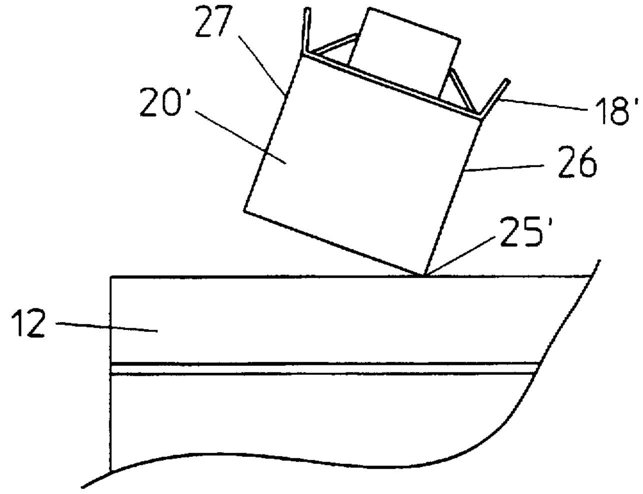
FIG. 7 is a view similar to FIG. 6 showing an alternate embodiment.

In the embodiment of FIG. 7, the brush assembly is arranged to form a single contact point with the commutator 12 as before, but this is achieved using a standard square faced brush 20' fitted to a brush arm 18' which has been twisted, resulting in the brush 20' contacting the commutator at a single point along a single contact ridge 25'. Again, the urging of the brush leaf 18' places a twisting moment on the brush leaf to reduce its bouncing without increasing the brush contact pressure.

Figure 8:
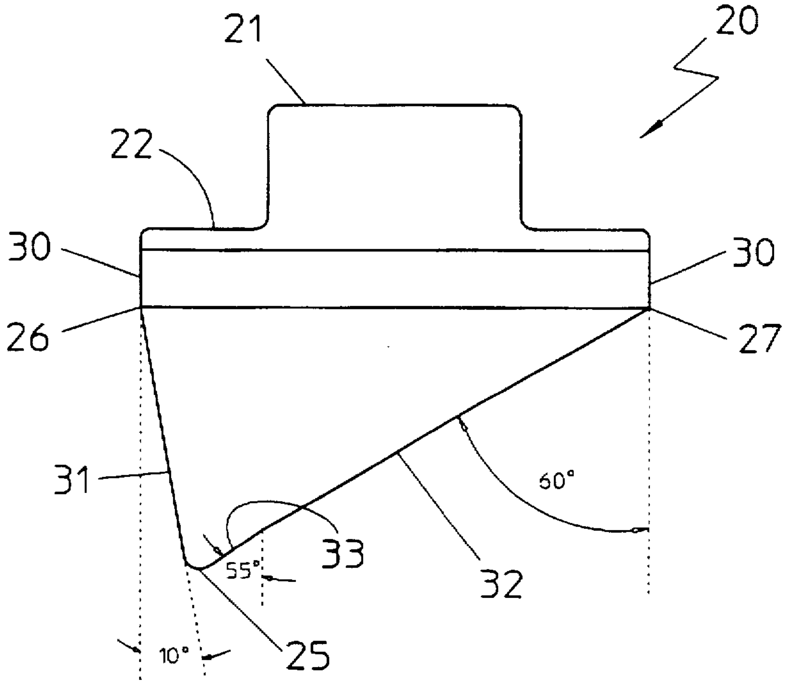
FIG. 8 is an elevational view of a modified brush.

A further embodiment provides for a particular shape of the brush as shown in FIG. 8. The brush appears to have a vertically extending side face 26, i.e., a face which extends perpendicular to the motor axis when the motor is assembled. However, it does not extend perpendicular to the brush arm. The brush is shown in FIG. 8 oriented with its axis vertical as it would appear in its free form when attached to the brush arm, i.e., before contact with the commutator. The brush 20 is shaped so that in use, side 26 of brush 20 will extend perpendicular to the motor axis. This is desired so that it forms a stable contact point with the commutator as the brush wears. By stable we mean that the contact area grows in one direction only so that the position of one edge of the contact area is constant. This means that the size of the commutator can be minimised as the contact point is not allowed to wander axially across the commutator surface. This also provides good contact between the commutator and the brush as the brush beds in with the commutator. However, the edge of the brush is actually sloping with respect to the base brush when the brush is mounted to the brush arm but because of the twist in the brush arm during use, the side extends substantially perpendicular to the motor axis. The preferred angle of the side of the brush as illustrated in FIG. 8 is about 10° which allows for a 10° twist in the brush arm.

Accordingly, the brush body 20 is formed with a mounting projection 21 on its upper surface 22, with a ridge 25 formed on the lower surface which contacts the commutator and with sides 26 and 27 extending between the ridge 25 and the upper surface. The ridge extends substantially parallel to the upper surface and to the sides 26 and 27. Both sides have a short vertical portion 30 adjacent the upper surface 22. Side 26, being the side towards which the ridge 25 is offset, has a lower portion 31 which extends at substantially 10° to the vertical. The other side 27 is divided into three portions: a vertical portion 30 adjacent the upper face as already mentioned, an initial portion 33 adjacent the ridge 25 which extends at 55° to the vertical and a main portion 32, joining the other two portions, extending at 60° to the vertical. The 5° difference between the main portion 32 and the initial portion 33 of side 27 provides the ridge with slightly more material to slightly retard the initial wear of the brush as it beds in.

Figure 9:
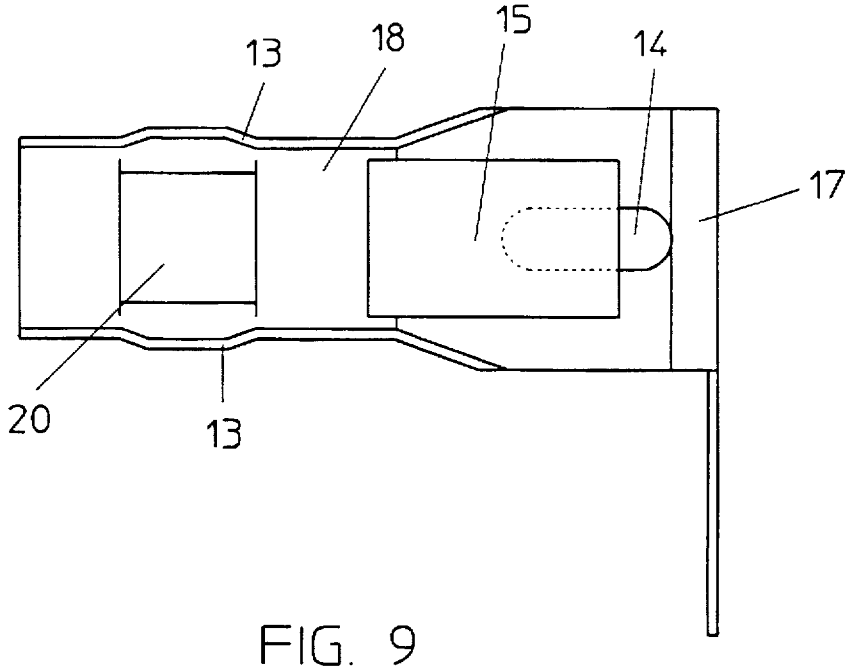
FIG. 9 is an elevational view of a brush assembly showing a brush arm according to a further embodiment.

FIG. 9 illustrates a preferred configuration of the brush arm in which a damper 15 is fixed to the brush arm to absorb or reduce the vibrations generated in the brush arm during operation of the motor. The damper may be of any suitable material but is preferably a synthetic rubber based material attached to the brush arm by adhesive.

A slot 14 extends longitudinally of the brush arm in a portion of the brush arm adjacent the brush holder 17. The provision of the slot 14 reduces the spring force of the brush arm in this area while increasing its flexibility. By increasing the size of the slot, the spring force of the brush arm can be reduced while maintaining a wide base to the brush arm to prevent the brush arm moving laterally, allowing the brush to meander axially across the surface of the commutator. It also limits the bending of the brush arm to this portion of the brush arm. Bending of the brush arm is further limited to this portion by reinforcing ribs 13 formed along each side of the brush arm at the distal end thereof.

Figure 10:
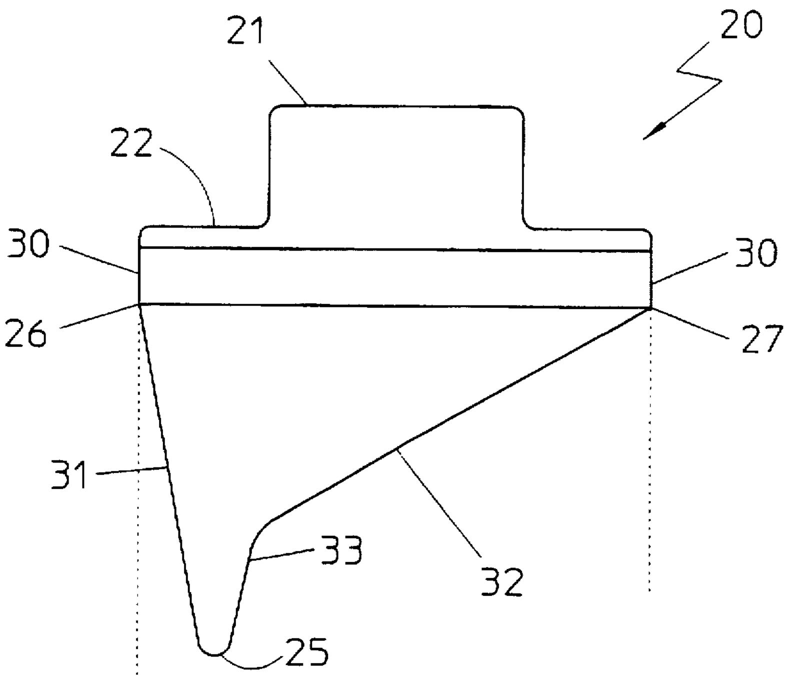
FIG. 10 is a view similar to FIG. 8 showing a further modification.

FIG. 10 illustrates a brush similar to the brush of FIG. 8 except that the ridge 25 is more pronounced. This provides a longer running time with a smaller contact area, meaning that the point contact with the commutator is maintained to ensure a better bedding in of the brush and the commutator contact surface.

Various modifications will be apparent to those skilled in the art. It is desired to include all such modifications as fall within the scope of the invention as defined herein.

What is claimed is:

1. A brush assembly for an electric motor, the brush assembly comprising:

a brush body for making sliding contact with a commutator;

a brush holder; and elongate resiliently flexible electrically conductive brush arm supporting the brush body and electrically connecting the brush body to the brush holder, wherein the brush body contacts the commutator substantially at a single point which is laterally offset from a central plane of the brush body such that the resilient urgings of the brush body into contact with the commutator by the brush arm creates a twist in the brush arm.

2. A brush assembly as defined in claim 1 wherein the brush body comprises:

an upper face adapted to couple to the brush arm;

a lower face adapted to make sliding contact with a commutator of the motor;

first and second sides extending between the upper and lower faces; and first and second end faces extending between the upper and lower faces and between the first and second sides;

the brush body being adapted so that, in use, the first and second sides are spaced in an axial direction of the commutator and the first and second end faces are spaced in a circumferential direction of the commutator, the lower face having a single ridge extending between the first and second end faces and offset towards the first side for making the single point contact with the commutator.

3. A brush body as defined in claim 1, wherein the ridge extends substantially parallel to the upper face and the first and second sides and substantially perpendicular to the first and second end faces.

4. A brush body as defined in claim 1, wherein the first and second sides include portions which extend at an angle to the central plane of the brush body.

5. A brush body as defined in claim 1, wherein the first side has a portion which extends at substantially 10° to the central plane of the brush body.

6. A brush body as defined in claim 1, wherein the second side has a portion which extends at substantially 60° to the central plane of the brush body.

7. A brush body as defined in claim 1, wherein the second side has an initial portion adjacent the ridge which extends at substantially 55° to the central plane of the brush body, a main portion which extends at substantially 60° to the central plane of the brush body and a final portion adjacent the upper face which extends substantially vertically.

8. A brush assembly as defined in claim 1 wherein the brush body has a ridge arranged to form a point contact with the commutator, the ridge being laterally offset from the central plane of the brush body.

9. A brush assembly as defined in claim 8, wherein the ridge extends substantially parallel to and adjacent a side face of the brush body.

10. A brush assembly as defined in claim 8 wherein a damper is fitted to the brush arm to dampen vibrations in the brush arm during use which damper tends to resiliently oppose the twist applied to the brush arm.

11. A brush assembly as defined in claim 10, wherein a portion of the brush arm has a longitudinal slot which reduces the surface area of the brush arm and substantially limits the resilient bending of the brush arm to substantially within the portion.

12. A brush assembly as defined in claim 1 wherein a damper is fitted to the brush arm to dampen vibrations in the brush arm during use which damper tends to resiliently oppose the twist applied to the brush arm.

13. A brush assembly as defined in claim 12, wherein a portion of the brush arm has a longitudinal slot which reduces the surface area of the brush arm and substantially limits the resilient bending of the brush arm to substantially within the portion.

14. A brush assembly as defined in claim 1, wherein a portion of the brush arm has a longitudinal slot which reduces the surface area of the brush arm and substantially limits the resilient bending of the brush arm to substantially within the portion.

15. A brush assembly as defined in claim 1, wherein portions of the sides of the brush arm include reinforcing ribs such that the resilient bending of the brush arm is reduced within the portions.

16. A brush assembly for an electric motor, the brush assembly comprising:

- a brush body for making sliding contact with a commutator, the brush body including an upper face adapted to couple to the brush arm, a lower face adapted to make sliding contact with a commutator of the motor, first and second sides extending between the upper and lower faces and first and second end faces extending between the upper and lower faces and between the first and second sides;
- a brush holder; and
- an elongate resiliently flexible electrically conductive brush arm supporting the brush body and electrically connecting the brush body to the brush holder, wherein
  - the brush body contacts the commutator at a position which is laterally offset from a central plane of the brush body such that the resilient urgings of the brush body into contact with the commutator by the brush arm creates a twist in the brush arm;
  - the first and second sides of the brush body intersecting at a first axis which is substantially parallel to a central axis of the commutator; and
  - the first and second end faces of the brush body intersecting at a second axis which is substantially perpendicular to the central axis of the commutator,
- the lower face having a single ridge extending between the first and second end faces and offset towards the first side.

* * * * *